US006285386B1

(12) United States Patent
Suzuki

(10) Patent No.: US 6,285,386 B1
(45) Date of Patent: Sep. 4, 2001

(54) SHEET TREATING APPARATUS FEATURING A LINEAR CONVEYANCE PATH WITHIN A HEAT DEVELOPING REGION

(75) Inventor: Kenichi Suzuki, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/578,342

(22) Filed: Dec. 26, 1995

(30) Foreign Application Priority Data

Jan. 11, 1995 (JP) .................................................. 7-018374

(51) Int. Cl.[7] ............................ B41J 2/385; B41J 2/435; H05B 1/00; G03B 13/00

(52) U.S. Cl. .......................... 347/155; 347/262; 347/264; 219/216; 396/575; 355/27; 399/335

(58) Field of Search .................................... 347/155, 153, 347/251, 262, 264, 212, 102; 399/320, 335, 330, 328, 329; 219/216, 338; 346/136, 25; 430/203; 432/59; 355/405; 396/575

(56) References Cited

U.S. PATENT DOCUMENTS 4,446,467 * 5/1984 Takiguchi et al. .................. 347/172
4,796,037 * 1/1989 Takada et al. ....................... 347/156
4,958,169 * 9/1990 Mochizuki et al. ................ 347/262
5,210,616 5/1993 Kawasaki et al. ................... 358/296
5,411,825 5/1995 Tam ...................................... 430/41

FOREIGN PATENT DOCUMENTS 53-34515 3/1978 (JP) .
55-18927 5/1980 (JP) .

OTHER PUBLICATIONS

*Webster's New World Dictionary*, 3rd ed., p. 964, 1988.*

* cited by examiner

*Primary Examiner*—David F. Yockey
(74) *Attorney, Agent, or Firm*—Fitzpatrick, Cella, Harper & Scinto

(57) ABSTRACT

A sheet treating apparatus has a container containing a plurality of sheets therein, a recorder for effecting recording on the sheets, a substantially straight path for conveying the recorded sheets and a heat-developer for heat-developing the sheets in the path. The container and/or the recorder are disposed under the heat-developer, are vertically overlapped with one another, and may be vertically overlapped with the heat-developer. The container and the straight path are disposed so that the straight path and the sheets in the container may be substantially parallel or substantially orthogonal to one another.

8 Claims, 5 Drawing Sheets

SHEET TREATING APPARATUS FEATURING A LINEAR CONVEYANCE PATH WITHIN A HEAT DEVELOPING REGION

BACKGROUND OF THE INVENTION

1. Field of the Invention

This invention relates to a sheet treating apparatus for use in a recording apparatus or the like for recording images on sheet film.

2. Related Background Art

In a laser imager for recording on film an image signal obtained by the use of a diagnosing apparatus such as CT or MRI, the image signal inputted is first modulated into the intensity of a laser beam, and then this laser beam is applied to the film and the film is sensitized in conformity with the density of the image to thereby effect recording. Subsequently, the sensitized film is developed by a developing apparatus, whereby an image having light and shade conforming to the image signal is obtained on the film. High harmony is required of film for medical treatment images according to the prior art and therefore, film having silver salt emulsion applied thereto is sensitized with intensity conforming to an image to thereby effect recording, and the film is subjected to the so-called wet type developing process in which the film is immersed in developing liquid and fixating liquid for a predetermined time to thereby effect a developing process.

Such a wet type developing process, however, uses chemical liquids such as developing liquid and fixating liquid and is therefore cumbersome in treatment. Also, these chemical liquids become deteriorated and unusable when a predetermined process is carried out and therefore, it is necessary to interchange them suitably. The chemical liquids after used need be disused, and there is the inconvenience that the waste liquids produced at such time cause environmental problems.

So, there has been proposed a so-called dry type silver salt system which is similar to the wet type developing process in using film having silver salt emulsion applied thereto, but applies a laser beam to the film to effect recording, and thereafter carries out a heating process to thereby develop the film. An example of such dry type silver salt system is disclosed in Japanese Patent Application Laid-Open No. 53-34515. Also, various kinds of heat developing apparatuses for use in such dry type silver salt system have heretofore been proposed, and an example of them is one disclosed in Japanese Patent Publication No. 55-28927 or U.S. Pat. No. 5,411,825. It is possible to couple such a heat developing apparatus to a laser imager as described in U.S. Pat. No. 5,210,616 and effect recording and development by the use of film of the above-described dry type silver salt type instead of wet type film.

FIG. 10 of the accompanying drawings shows the construction of a laser image using such a dry type silver salt system. A supply magazine 2 and a receive magazine 3 are provided in parallel in a recording apparatus 1, and an optical unit 4 for applying a laser beam L downwardly is provided above the receive magazine 3. A heat developing apparatus 6 having a developing roller 5 is provided on the left side of the recording apparatus 1, and this heat developing apparatus 6 is formed with an opening 6*a* for discharging film F therethrough. The solid line in FIG. 10 indicates the conveyance path of the film F.

The unrecorded film F in the supply magazine 2 passes along the conveyance path and recording by the laser beam L is effected on the film F below the optical unit 4. Further, this film F is conveyed to the heat developing apparatus 6, is developed by the developing roller 5 and is discharged from the opening 6*a* in the heat developing apparatus 6.

However, when such a heat developing apparatus 6 is used in the laser imager, it is necessary to heat the recorded film F for a predetermined time, e.g. 10 seconds, and therefore, when the recorded film F is to be heated and developed while it is conveyed, if the throughput of recording, i.e., the number of sheets of film capable of being treated within a unit time, is taken into account, the speed of conveying the film cannot be made very low and the film must be heated over a very long distance. Therefore, the diameter of the rotatable developing roller 5 is made considerably large and thus, the dimensions of the entire apparatus becomes large.

Further, the film F is heated and developed while being twined around the developing roller 5, and this also leads to the problem that the film F becomes curled.

There is also the problem that particularly the characteristic of the laser which is a recording light source is varied by the heat generated from the heat developing apparatus 6 or the temperature of the film F during recording rises and when recording is to be continuously effected, the recording characteristic changes between the film F recorded at first and the film F recorded later.

SUMMARY OF THE INVENTION

The present invention has as an object thereof to find out optimum disposition relationship between units to thereby provide a compact and highly accurate sheet treating apparatus and method.

One preferred form of the sheet treating apparatus according to the present invention has containing means containing a plurality of sheets therein, recording means for effecting recording on the sheets, a substantially straight path for conveying the recorded sheets, and heat developing means for heat-developing the sheets in the path, and is characterized in that the containing means and the recording means are disposed under the heat developing means.

Another preferred form of the sheet treating apparatus according to the present invention has containing means for containing a plurality of sheets therein, recording means for effecting recording on the sheets, a substantially straight path for conveying the recorded sheets, and heat developing means for heat-developing the sheets in the path, and is characterized in that the containing means and the straight path are disposed so that the straight path and the sheets in the containing means may be substantially parallel or substantially orthogonal to one another.

A preferred form of the film treating method of the present invention is characterized in that recording is effected on film at a recording position and the recorded film is heat-developed above the recording position without being curled.

Further objects and preferred forms of the present invention will become apparent from the following detailed description of some embodiments of the invention.

DESCRIPTION OF THE PREFERRED EMBODIMENTS

The invention will hereinafter be described in detail with respect to some embodiments thereof shown in FIGS. 1 to 9.

Figure 1:
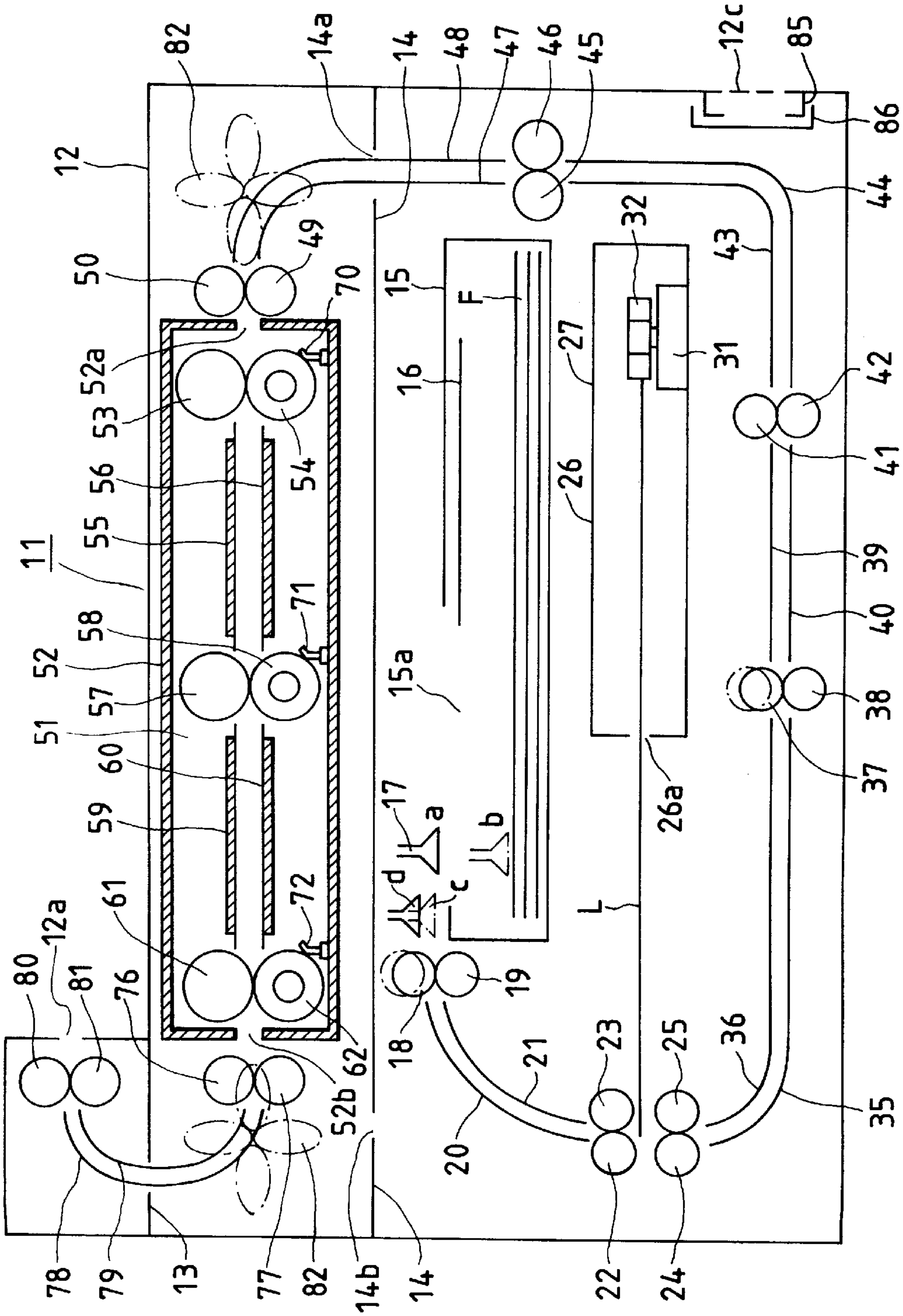
FIG. 1 shows the construction of a first embodiment of the present invention.

Referring to FIG. 1 which shows the construction of a first embodiment of the present invention, an image recording apparatus 11 has its interior covered as a dark space with a cover 12, and an opening 12*a* for film F to pass therethrough is formed in the upper portion of the cover 12. The interior of the cover 12 is partitioned by partition walls 13 and 14 to thereby prevent a light beam having entered the opening 12*a* in the cover 12 from further entering the interior. The partition wall 14 is formed with two openings 14*a* and 14*b* for the air to flow therethrough.

A removably insertable supply magazine 15 containing piled unused films F therein is contained horizontally in the cover 12. This supply magazine 15 is formed with an opening 15*a* for taking out the films F therethrough. Further, a lid portion 16 for opening and closing the opening 15*a* is attached to the supply magazine 15 so that when the lid portion 16 is closed, the supply magazine 15 may have its interior kept as a dark space. Each film F has only its underside formed into a silver salt emulsion surface, and a latent image may be recorded by a minute laser beam being applied to the silver salt emulsion surface, and by this latent image being developed, an image can be formed to thereby accomplish recording.

A plurality of suckers 17 capable of sucking the films F are provided above the opening 15*a* in the supply magazine 15 in the direction of depth, and these suckers 17 are movable to the positions a to d of FIG. 1. At the left of the position c of the suckers 17, there are provided a pair of conveying rollers comprising conveying rollers 18 and 19, and bulged portions for sandwiching the film F are formed at a plurality of locations in the direction of depth of the conveying roller 18, and the conveying roller 18 is retractable to the dot-and-dash line position of FIG. 1 by a mechanism, not shown.

Further, at the left of the conveying rollers 18 and 19, there are provided in succession a conveying path comprising guide plates 20 and 21, a pair of sub-scanning rollers comprising sub-scanning rollers 22 and 23, and a pair of sub-scanning rollers comprising sub-scanning rollers 24 and 25. The sub-scanning rollers 22 to 25 are adapted to have highly accurate servo applied thereto by a drive source and power transmitting means, not shown, and to be rotated at a uniform speed.

On the other hand, an optical unit 27 having its interior covered as a dark space with a cover 26 is provided below the supply magazine 15, and this optical unit 27 is adapted to be capable of applying a laser beam L from an opening 26*a* formed in the left side of the cover 26 to between the sub-scanning roller 23 and the sub-scanning roller 25 to thereby effect main scanning.

Figure 2:
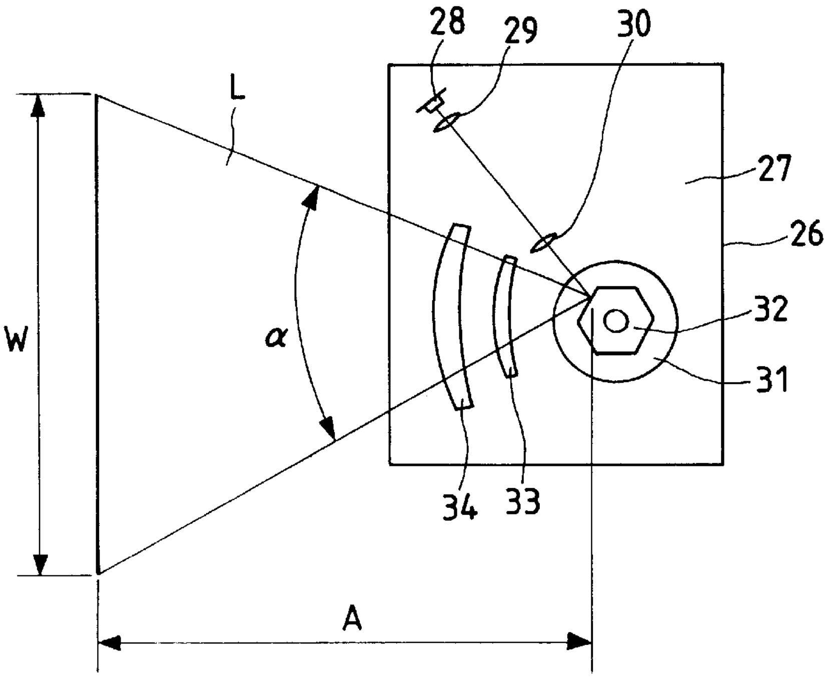
FIG. 2 is a plane view of an optical unit.

Referring now to FIG. 2 which is a plane view of the optical unit 27, lenses 29, 30 and a rotational polygon mirror 32 rotatable at a predetermined speed by a motor 31 are arranged in succession in the direction of emission of a laser source 28 emitting the laser beam L modulated in conformity with image data to be recorded. Further, the laser beam L reflected by the rotatable polygon mirror 32 may pass through lenses 33 and 34, whereafter it may be sectorally scanned between the sub-scanning rollers 23 and 25 and be applied to the film F.

If the scanning angle $\alpha$ of the rotatable polygon mirror 32 is too great, the shape of the laser beam L will be varied by the influence of the aberrations or the like of the optical system or the deviation of the focus of the optical system will become great and therefore, it is preferable that the scanning angle $\alpha$ be of the order of 30 to 40 degrees or less. Accordingly, when for example, film F of 35×43 cm is mainly scanned in the direction of 35 cm and the effective width W of this film F is 33 cm, the distance A of the path along which the laser beam L reflected by the rotatable polygon mirror 32 passes until it arrives at the film F is about 45 to 50 cm, which is equal to or greater than the length of the film F in the direction of movement thereof.

Also, in FIG. 1, a conveying path comprising guide plates 35 and 36 and a pair of conveying rollers comprising conveying rollers 37 and 38 are provided in succession below the sub-scanning rollers 24 and 25, and the conveying roller 37 is retractable to a dot-and-dash line position. Further, at the right of the conveying rollers 37 and 38, there are provided in succession a conveying path comprising guide plates 39 and 40, a pair of conveying rollers comprising conveying rollers 41 and 42, a conveying path comprising guide plates 43 and 44, a pair of conveying rollers comprising conveying rollers 45 and 46, a conveying path comprising guide plates 47 and 48, and a pair of conveying rollers comprising conveying rollers 49 and 50.

At the left of the conveying rollers 49 and 50, there is provided a heat developing portion 51, which is covered with a partition wall 52 made of a material of good heat insulation, and in the right and left sides of this partition wall 52, there are formed openings 52*a* and 52*b*, respectively, for the film F to pass therethrough. At the left of the opening 52*a* in the partition wall 52, there are provided in succession a pair of conveying rollers comprising conveying rollers 53 and 54, a conveying path comprising guide plates 55 and 56, a pair of conveying rollers comprising conveying rollers 57 and 58, a conveying path comprising guide plates 59 and 60, and a pair of conveying rollers comprising conveying rollers 61 and 62 so that the film F can be conveyed to the opening 52*b* in the partition wall 52 along the conveying paths by these pairs of conveying rollers.

Figure 3:
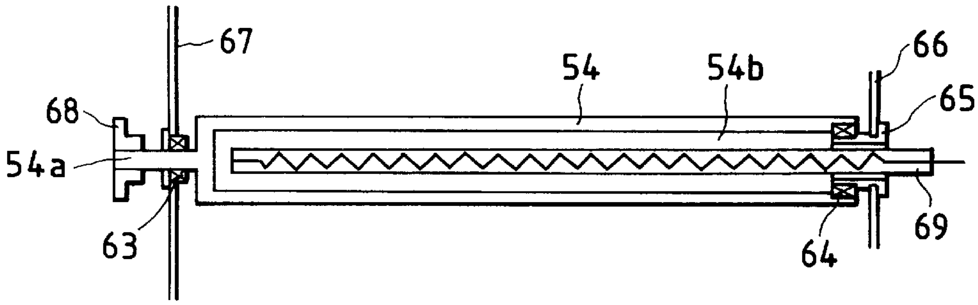
FIG. 3 is a cross-sectional view of the conveying roller of a developing portion.

Referring to FIG. 3 which is a cross-sectional view of the conveying roller 54, the conveying roller 54 is rotatably supported by frames 66 and 67 through bearings 63, 64 and a bearing holder 65 having its central portion opened to form a circular ring shape. The left end portion 54*a* of the conveying roller 54 is reduced in diameter, and a gear 68 connected to drive means, not shown, is mounted on this left end portion 54*a*. The interior of the conveying roller 54 is formed into a cavity 54*b*, in which a heater 69 is inserted through the bearing holder 65 and the bearing 64.

Further, as shown in FIG. 1, a temperature sensor 70 having its detecting portion adapted to contact with the surface of the conveying roller 54 is provided on the lower portion of the conveying roller 54. The conveying rollers 58 and 62, like the conveying roller 54, are also rotatable by the drive means, and heaters are inserted in the internal cavities 58*a* and 62*a* thereof, and temperature sensors 71 and 72 are provided on the lower portions thereof so as to contact with the surfaces of the conveying rollers 58 and 62, respectively.

Figure 4:
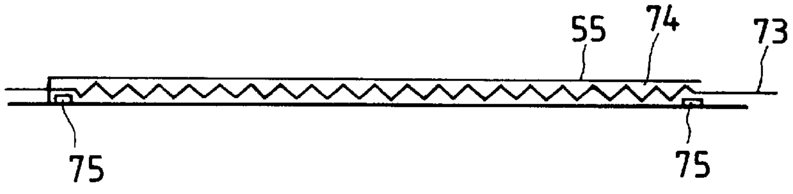
FIG. 4 is a cross-sectional view of the guide plate of the developing portion.

Referring to FIG. 4 which is a cross-sectional view of the guide plate 55, a heater 74 containing a resistance wire 73 therein is attached to the guide plate 55, and temperature sensors 75 for detecting the temperature of the heater 74 are provided on the opposite sides of the guide plate 55. Although not shown, the guide plates 56, 59 and 60, like the guide plate 55, are also provided with temperature sensors.

At the left of the opening 52*b* in the partition wall 52, there are provided in succession a pair of conveying rollers comprising conveying rollers 76 and 77, a conveying path comprising guide plates 78 and 79, and a pair of conveying rollers comprising conveying rollers 80 and 81 so that the film F conveyed to the conveying rollers 80 and 81 may be discharged outwardly through the opening 12*a* in the cover 12.

Figure 5:
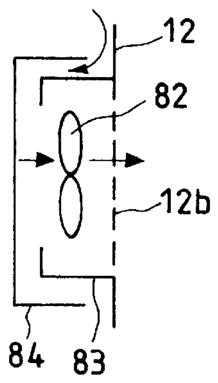
FIG. 5 is a cross-sectional view of a portion around a fan.
Figure 6:
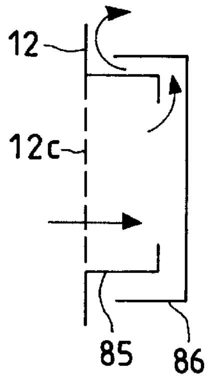
FIG. 6 is a cross-sectional view of a portion around an opening.

In FIG. 1, two fans 82 are provided on the front surface or the back surface of the cover 12. FIG. 5 is a cross-sectional view of the fan 82 and a portion around it. The fan 82 is adapted to be capable of discharging the internal air through the opening 12*b* formed in the cover 12. The fan 82 is covered with two partition walls 83 and 84 to thereby prevent any extraneous light beam from entering the interior. On the other hand, an opening 12*c* for introducing the air is formed in the lower portion of the cover 12, and as shown in FIG. 6, the opening 12*c* is covered with two partition walls 85 and 86 so as to prevent any extraneous light beam from entering the interior through the opening 12*c*. Further, the partition wall 14 is formed with two openings 14*a* and 14*b* so as not to hamper the flow of the air in the cover 12.

When recording is to be effected, upon closing of a power source switch, not shown, the conveying rollers 54, 58, 62 and the guide plates 56, 60 are heated by the heaters 69 and 74 therein. The temperatures of the conveying rollers 54, 58, 62 and the guide plates 56, 60 are detected by the temperature sensors 70 to 72 and 75, and the surface temperatures of the conveying rollers 54, 58, 62 and guide plates 56, 60 are controlled so as to be within a predetermined range by control means, not shown. When the temperatures of the conveying rollers 54, 58, 62 and guide plates 56, 60 reach a predetermined temperature, display means, not shown, displays that recording is possible.

Next, when instructions for effecting recording are given by instructing means, not shown, the suckers 17 are moved from the position a to the position b and such the uppermost one of the film F in the supply magazine 15. At this time, the conveying roller 18 has already been moved to a solid-line position and further, the suckers 17 are moved to the position c and the leading end of the film F is nipped by and between the conveying rollers 18 and 19, whereafter the suckers 17 releases their sucking of the film F and are retracted to the position d. Thereby, the film F is separated from the suckers 17, and when the conveying rollers 18 and 19 are rotated, the film F is conveyed leftwardly downwardly along the guide plates 20 and 21 and is nipped by and between the sub-scanning rollers 22 and 23.

When the film F is nipped by and between the sub-scanning rollers 22 and 23, the conveying rollers 18 and 37 are moved to their dot-and-dash line positions, whereafter the sub-scanning rollers 22 to 25 begin to rotate at the same speed. When the leading end of the film F is nipped by and between the sub-scanning rollers 24 and 25, the laser source 28 of the optical unit 27 emits the laser beam L modulated by an image signal, and this laser beam is deflected by the rotatable polygon mirror 32, whereby main scanning is effected. At the same time, sub-scanning is effected by the sub-scanning rollers 22 to 25, and the leading end of the film F is moved downwardly rightwardly along the guide plates 35 and 36. As the recording further progresses, the trailing end of the film F moves along the guide plates 20 and 21, but since the guide plates 20 and 21 are provided smoothly from the vicinity of the conveying rollers 18, 19 to the vicinity of the sub-scanning rollers 22, 23, any shock which will affect the recording is not applied to the film F.

The laser source 28 completes the application of the laser beam L immediately before the trailing end of the film F leaves the sub-scanning rollers 22 and 23, and thereafter the conveying roller 37 is moved to a solid-line position and is rotated, whereby the film F is conveyed rightwardly. Hereupon, the conveying rollers 41, 42, 45, 46, 49 and 50 begin to be rotated to thereby convey the film F upwardly along the guide plates 43, 44, 47 and 48, and the film F is nipped by and between the conveying rollers 53 and 54 in the heat developing portion 51 through the opening 52*a* in the partition wall 52.

Subsequently, the conveying rollers 53, 54, 57, 58, 61 and 62 are rotated to thereby convey the film F leftwardly along the guide plates 55, 56, 59 and 60, and the film F is nipped by and between the conveying rollers 76 and 77. At this time, the film F is heated and developed by the heaters 69 and 74 of the conveying rollers 54, 58, 62 and guide plates 56, 60. The conveying rollers 76, 77, 80 and 81 are then rotated to thereby convey the developed film F along the guide plates 78 and 79, and the film F is discharged through the opening 12*a* in the cover 12. When recording is to be continuously effected, a similar operation can be repeated. Or if the suckers 17 are again moved to the position b to start the separation of the next film F when the trailing end of the film F leaves the sub-scanning rollers 24 and 25, the throughput of the film F will be improved.

During recording, the fan 82 is rotated to introduce the air through the opening 12*c* in the cover 12 and discharge the air through the opening 12*b*. Thus, the air warmed by the heat developing portion 51 does not flow downwardly from the partition wall 14 and the temperature around the scanning position can be kept substantially constant.

Also, when the temperatures of the conveying rollers 54, 58, 62 and guide plates 56, 60 detected by the temperature sensors 70 to 72 during development deviate from a predetermined range, if the film F is passing them, the next film F is stopped short of the conveying rollers 53 and 54 after that film F has passed the conveying rollers 61 and 62, and the conveyance of the film F is resumed after the temperatures of the conveying rollers 54, 58, 62 and guide rollers 56, 60 again fall within the predetermined range.

While in the present embodiment, the heaters are attached to all of the guide plates 55, 56, 59 and 60, the heaters may be attached to only some of the guide plates, or if a heater is mounted in at least one of the conveying rollers 54, 58 and 62, the heaters of the guide plates 55, 56, 59 and 60 can be eliminated.

The heaters may be attached to some of the rollers 53, 57, 61 same as 54, 58, 62.

Figure 10:
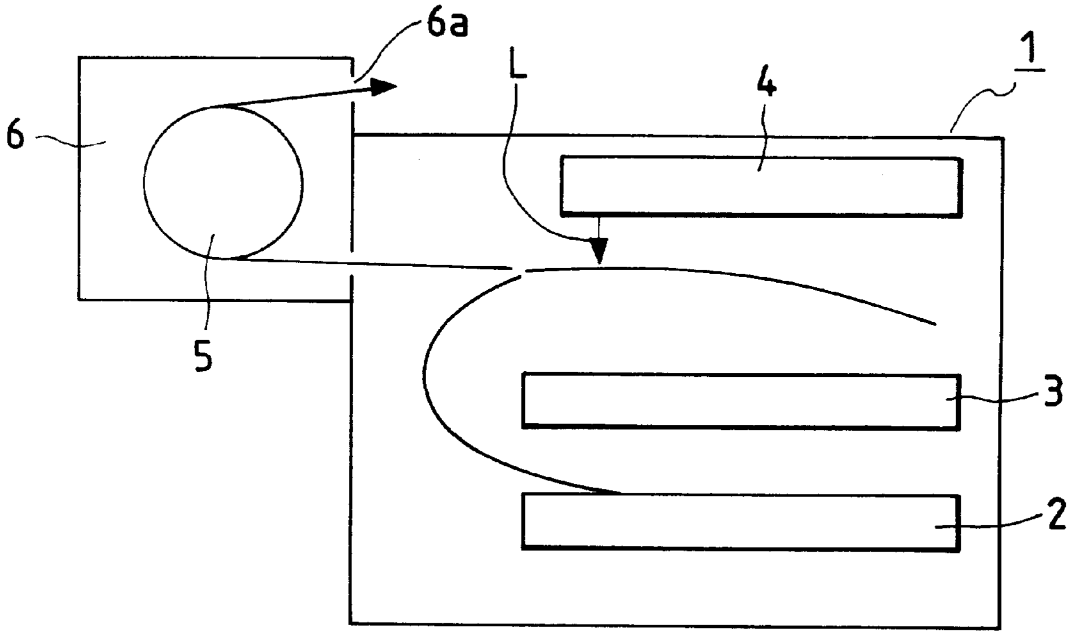
FIG. 10 PRIOR ART
FIG. 10 shows the construction of an example of the prior art.

According to the present embodiment, the film is heated and developed by the heat developing means having a straight path and therefore, the film is not curled by development. When the film is to be developed by such straight developing means, it is necessary to heat the film at a predetermined temperature, e.g. for 10 seconds, and when an attempt is made to convey film of 35 cm×43 cm common as film for medical treatment in parallelism to a side of 43 cm and develop a film within 20 seconds, the heating path of the heat developing means will become long, and if the heat developing means is disposed laterally of the recording apparatus as shown in FIG. 10, the installation area of the apparatus will become large.

So, in the present embodiment, the supply magazine, the optical unit and the heat developing means are disposed horizontally and so as to vertically overlap one another, whereby there is achieved an apparatus which is small in floor installation area. Also, the conveyance path of the film is made into a lateral U-shape, whereby further downsizing of the apparatus is achieved. Also, the film is conveyed in one direction from the first to the last and need not be reversed in direction on its way, the conveyance path and the conveyance structure are simple.

Also, according to the present embodiment, the conveyance path from the recording position to the heat developing means is made longer than the length of the film in the direction of conveyance, whereby the leading end of the film does not enter the heat developing means during the recording on the film and therefore, the quality of recorded image is not deteriorated by the shock when the film is nipped by and between the rollers of the heat developing means.

Further, since the heat developing device 11 is provided on the uppermost portion of the apparatus, the heat radiated therefrom does not adversely affect the supply magazine 15 and the optical unit 27. In the present embodiment, the partition wall 14 is further provided to thereby further reduce the influence of heat.

Figure 7:
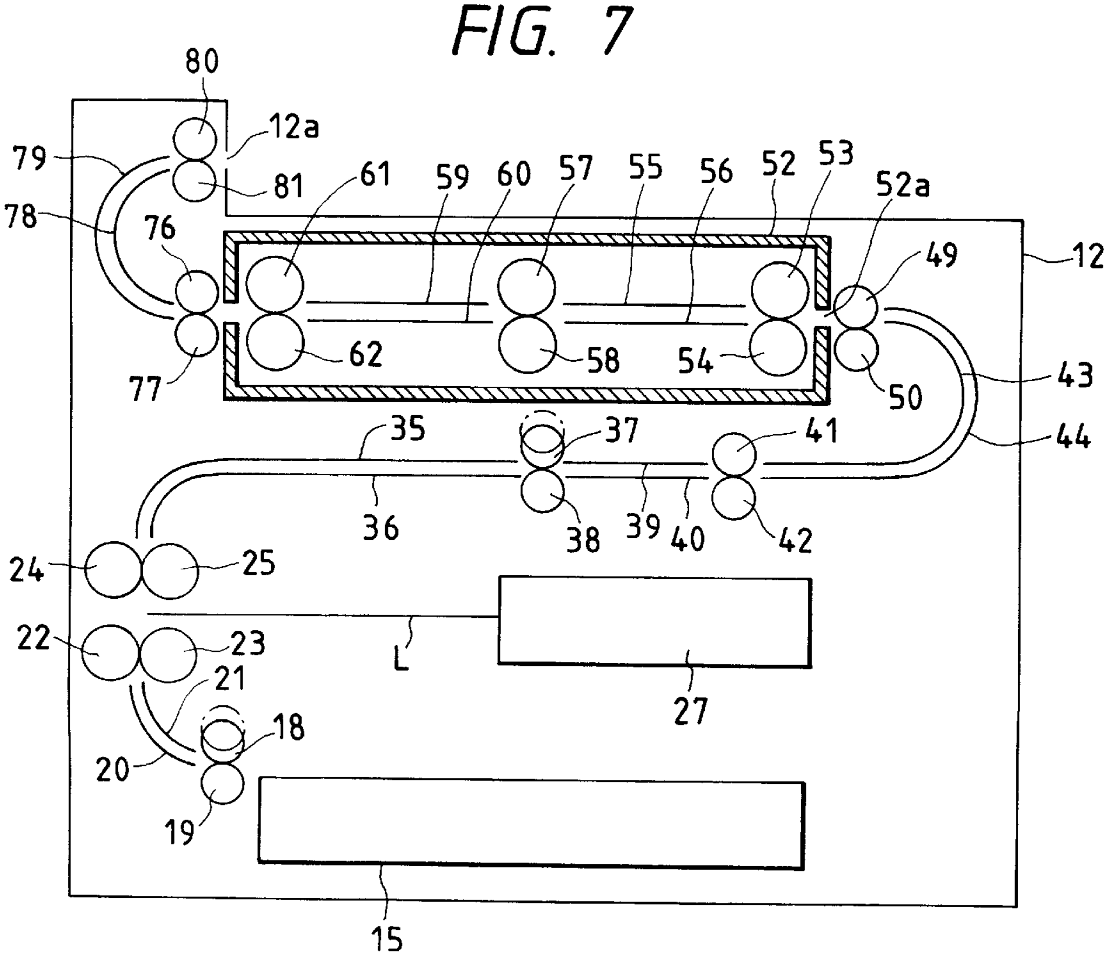
FIG. 7 shows the construction of a second embodiment of the present invention.

In FIG. 7 which shows the construction of a second embodiment of the present invention, the same reference numerals as those in FIG. 1 designate the same members. This second embodiment differs only in arrangement from the first embodiment. In the first embodiment, the emulsion surface of the film F faces downwardly when the film F passes through the heat developing portion 51 and therefore, due to the influence of grarity, the emulsion contacts with the guide plates 56 and 60 and depending on the property of the emulsion, the emulsion surface of the film F may be damaged, but by arrangement being done as in the second embodiment, the upper surface of the film F is the emulsion surface in the heat developing portion 51 and thus, the film F is not damaged.

Figure 8:
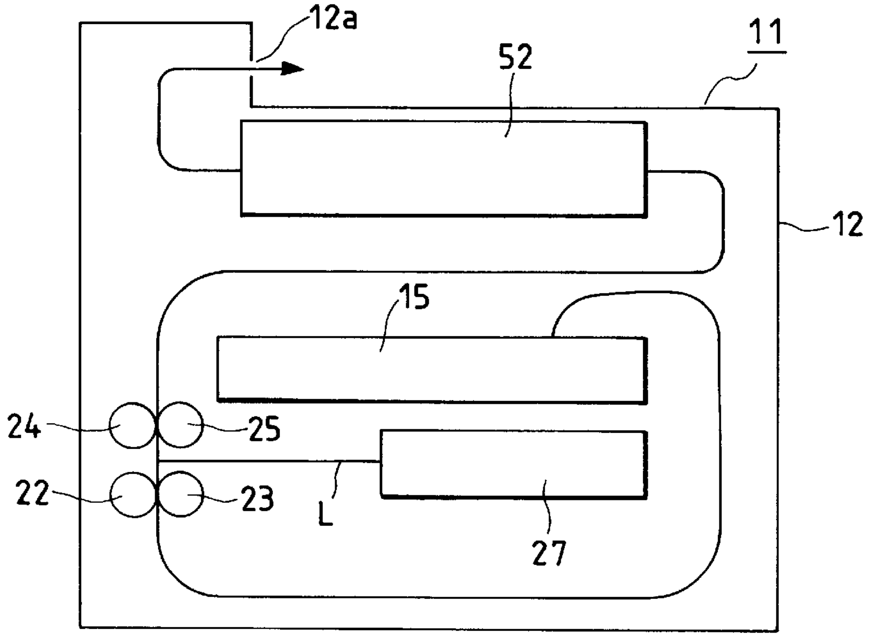
FIG. 8 shows the construction of a third embodiment of the present invention.

Referring to FIG. 8 which shows the construction of a third embodiment of the present invention, it shows only the conveyance path of the film F. In the second embodiment, the suckers 17 contact with the emulsion surface of the film F and effect sucking and therefore, depending on the kind of the emulsion and the material of the suckers 17, fog may be created in those portions of the film F which are contacted by the suckers 17, but in the present embodiment, the suckers contact with the back surface opposite to the emulsion surface of the film F and therefore, no fog is created in the film F.

Figure 9:
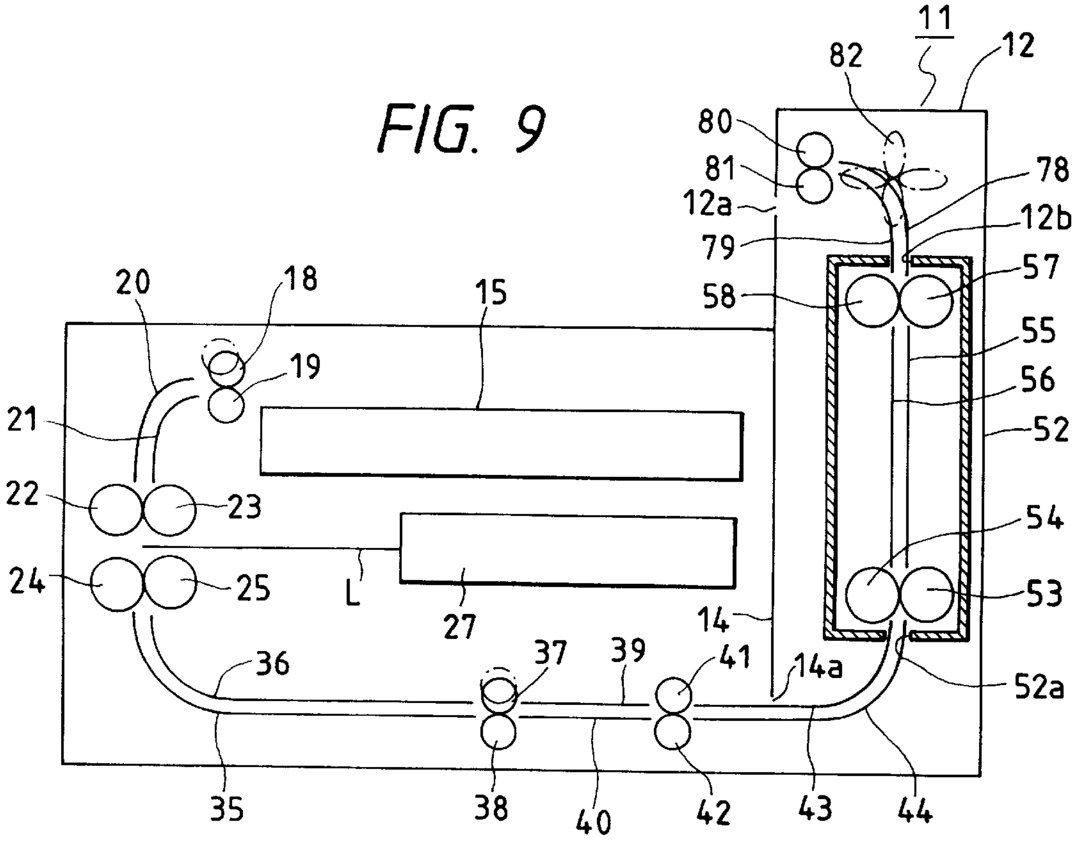
FIG. 9 shows the construction of a fourth embodiment of the present invention.

Referring to FIG. 9 which shows the construction of a fourth embodiment of the present invention, the heat developing portion 51 is disposed substantially in a vertical direction. This leads to the advantage that as compared with the first embodiment, the conveyance path becomes simple and the height of the image recording apparatus 11 can be made small.

The heat developing means requires an adiabatic member or the like and therefore is considerably heavy, but in the present embodiment, this weight need not be supported by the recording portion, and this leads to the advantage that the weight resisting structure of the recording portion can be simplified.

In the present embodiment, it is difficult for the heat radiated from the heat developing means to affect the supply magazine and the optical unit and further, the influence of the heat is further reduced by the partition wall 14.

In FIG. 9, the supply magazine and the optical unit are disposed horizontally and the heat developing means is disposed so as to be vertical, but alternatively, the supply magazine and the optical unit may be disposed substantially vertically and the heat developing means may be disposed substantially horizontally (so as to be upper or lower) while keeping these positional relations.

As a further alternative, the supply magazine, the optical unit and the heat developing means may all be disposed so as to be substantially vertical or slantly while keeping these relative relations of FIG. 1 or 7, or 8.

What is claimed is:

1. A sheet treating apparatus comprising:

a container for containing a plurality of sheets therein;

a recorder for effecting recording on a sheet; and a conveyance path for conveying a recorded sheet; and a heat-developer for heat-developing the recorded sheet in the conveyance path, wherein said conveyance path is straight within at least said heat-developer, wherein said heat-developing is performed by heating the recorded sheet over a predetermined length of said straight conveyance path, wherein said straight conveyance path where the heat-developing is performed, said container and said recorder are arranged in a vertical direction, with said heat-developer being disposed at a position above said container and said recorder and being disposed so as to vertically overlap said container and said recorder, and wherein a length of the conveyance path from the recording position where the recording is effected by said recorder to said heat-developer is longer than a length of the recorded sheet in the direction of conveyance.

2. A sheet treating apparatus according to claim 1, wherein said container, said recorder, and said heat-developer are disposed substantially horizontally.

3. A sheet treating apparatus according to claim 1, wherein said recorder comprises a laser source and a scanning system for scanning a laser beam relative to the sheet.

4. A sheet treating apparatus according to claim 1, wherein said heat-developer comprises a rotatable roller for conveying the recorded sheet, and a heater for heating said roller.

5. A sheet treating apparatus according to claim 1, wherein said heat-developer comprises a guide plate for guiding the recorded sheet straight, and a heater for heating said guide plate.

6. A sheet treating apparatus according to claim 1, wherein the conveyance path between said container and said heat-developer is substantially U-shaped.

7. A sheet treating method comprising the steps of:

performing recording on a sheet at a recording position;

conveying a recorded sheet from the recording position to a position above the recording position; and heat-developing the recorded sheet above the recording position without curling the sheet, wherein the recorded sheet is conveyed along a straight conveyance path at least when the recorded sheet is heat-developed, wherein a position where the sheet is contained before the recording, a position where performing of the recording is performed, and a position where the heat-developing is performed are arranged such that the recorded sheet is heated over a predetermined length of said straight conveyance path, wherein the position where the sheet is contained, the position where performing of the recording is performed and the position where the heat-developing is performed are arranged in a vertical direction, with the heat-developing being performed in a position above the position where the sheet is contained and the position where performing of the recording is performed, wherein the position where the heat-developing is performed is disposed in a position so as to vertically overlap the position where the sheet is contained and the position where performing of the recording is performed, and wherein a length of a conveyance path from the recording position where the recording is performed to the position where the heat-developing is performed is longer than a length of the recorded sheet in the direction of conveyance.

8. A sheet treating apparatus comprising:

a container for containing a plurality of sheets therein;

a recorder for effecting recording on a sheet;

a conveyance path for conveying a recorded sheet;

a heater for heating the recorded sheet in said conveyance path, wherein said conveyance path is straight within at least said heater, wherein said heater heats the recorded sheet over a predetermined length of said straight conveyance path, and said straight conveyance path where heating is performed, said container and said recorder being arranged in a vertical direction, with said heater being disposed at a position above said container and said recorder and being disposed so as to vertically overlap said container and said recorder, and a length of the conveyance path from a recording position where recording is effected by said recorder to said heater is longer than a length of the recorded sheet in the direction of conveyance.

* * * * *